(12) United States Patent
Park et al.

(10) Patent No.: US 11,322,958 B2
(45) Date of Patent: May 3, 2022

(54) CHARGING STATION

(71) Applicant: LG ELECTRONICS INC., Seoul (KR)

(72) Inventors: Seungjong Park, Seoul (KR); Sunghee Han, Seoul (KR); Jinwon Kang, Seoul (KR); Jaeyoung Kim, Seoul (KR); Yousook Eun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 16/869,689

(22) Filed: May 8, 2020

(65) Prior Publication Data

US 2021/0126478 A1 Apr. 29, 2021

(30) Foreign Application Priority Data

Oct. 23, 2019 (KR) .................. 10-2019-0131884

(51) Int. Cl.
*H02J 7/00* (2006.01)
*G05D 1/02* (2020.01)

(52) U.S. Cl.
CPC ........ *H02J 7/0045* (2013.01); *H02J 7/00032* (2020.01); *G05D 1/0225* (2013.01)

(58) Field of Classification Search
CPC ... H02J 7/0045; H02J 7/00032; G05D 1/0225

USPC .......................................... 320/109
See application file for complete search history.

(56) References Cited

U.S. PATENT DOCUMENTS

| | | | | |
|---|---|---|---|---|
| 6,377,022 B1 * | 4/2002 | Rhoads | ................. | A47J 42/26 320/114 |
| 7,719,229 B2 * | 5/2010 | Kaneko | ................. | B60L 53/36 320/113 |
| 10,752,120 B2 * | 8/2020 | Zhang | ................. | B60L 53/18 |
| 10,873,194 B2 * | 12/2020 | Lydon | ................. | B60L 53/36 |
| 2018/0292837 A1 * | 10/2018 | Chen | ................. | G05D 1/024 |

FOREIGN PATENT DOCUMENTS

KR 10-2015-0109470 A 10/2015

* cited by examiner

*Primary Examiner* — Richard V Muralidar
(74) *Attorney, Agent, or Firm* — Birch, Stewart, Kolasch & Birch, LLP

(57) ABSTRACT

Disclosed is a charging station including a case, a rear hole elongated vertically on a rear surface of the case, a plug protruding to a rear side of the case for vertically sliding along the rear hole, a terminal provided at the case and allowing a moving robot to be docked thereto, and a moving mechanism for moving the terminal between a hidden position at which the terminal is located in the case and a docking position at which the terminal is protruding to a front side of the case.

20 Claims, 22 Drawing Sheets

CHARGING STATION

CROSS-REFERENCE TO RELATED APPLICATIONS

This application claims the benefit of the Korean Patent Application No. 10-2019-0131884 filed in the Republic of Korea on Oct. 23, 2019, which is hereby incorporated by reference in its entirety for all purposes as if fully set forth herein.

BACKGROUND

Field of the Disclosure

The present disclosure relates to a charging station for charging a moving robot.

Discussion of the Related Art

In general, a machine that performs a motion similar to humans' motion using an electrical or magnetic action is called a robot. Recently, robots have been used in various fields due to the development of control technologies, and examples of robots include surgical robots, housekeeping robots, service robots, aerospace remote robots, dangerous object handling robots, and the like.

In particular, moving robots may perform an operation, while moving in a room. For example, a robot cleaner cleans the floor, while traveling in a room. As another example, a guide robot may move, while guiding users in a public place such as an airport or a shopping mall.

Such a moving robot is equipped with a battery and the battery must be charged periodically.

In a related art, a method of charging the moving robot by directly putting a plug of the moving robot to an outlet has been used. However, such as method has a cumbersome problem because a user needs to directly connect/disconnect the plug to/from the outlet.

In order to solve the problem, a docking method has recently been adopted. For example, the related art document KR 10-2015-0109470A discloses a docking station for a moving robot. However, since the docking station disclosed in the related art document uses a power cable, it cannot be installed close enough to a wall provided with an outlet. Therefore, there is a limitation in that a relatively large space is required for installation of the docking station.

In addition, a person may be tripped over the power cable, or the moving robot may be caught in the power cable, while traveling, and the plug may be disconnected from the outlet.

RELATED ART DOCUMENT

[Patent document]
KR 10-2015-0109470A (Docking station for moving robot, published on Oct. 1, 2015)

SUMMARY

An aspect of the present disclosure is directed to providing a charging station that can be installed adjacent to a wall regardless of height of an outlet.

Another aspect of the present disclosure is directed to providing a charging station with improved safety by allowing a terminal to protrude only when a moving robot is charged.

To achieve these and other advantages and in accordance with the purpose of the disclosure, as embodied and broadly described herein, there is provided a charging station including: a plug configured to vertically slide along a rear hole vertically elongated on a rear surface of a case; and a moving mechanism configured to move a terminal to which the moving robot is docked between a hidden position located in the case and a docking position protruding to a front side of the case.

The charging station may further include: a receiver configured to wirelessly communicate with the moving robot and receive location information of the moving robot; and a controller configured to communicate with the receiver and control the moving mechanism such that the terminal moves to the docking position when the moving robot approaches within a predetermined distance to the charging station.

The receiver may be configured to receive position information of the moving robot. The controller may be configured to control the moving mechanism such that the terminal moves to the docking position when the moving robot approaches within a predetermined distance to the charging station and a remaining battery capacity of the moving robot is less than a predetermined value.

The charging station may further include a lifting mechanism for lifting and lowering the terminal and the moving mechanism.

The receiver may be configured to receive type information of the moving robot. The controller may be configured to control the lifting mechanism to lift and lower the terminal to a height corresponding to a connector of the moving robot.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
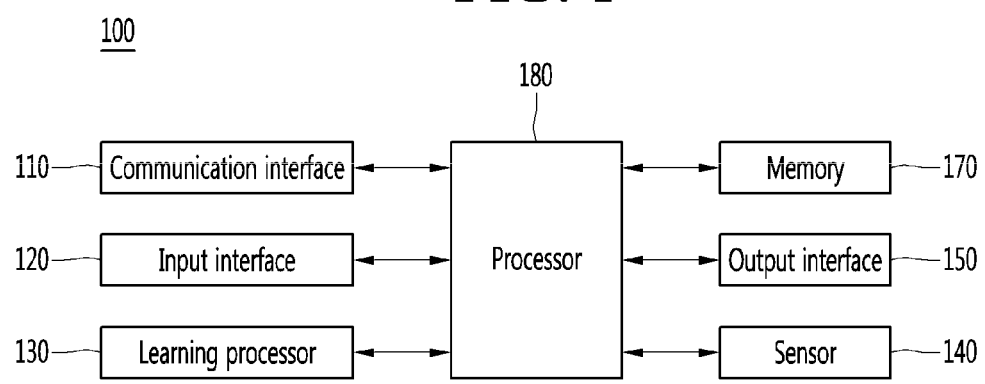
FIG. 1 illustrates an AI device including a robot according to an embodiment of the present disclosure.

Hereinafter, specific embodiments of the present disclosure will be described in detail.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state where a label for learning data is given, and the label may mean the correct answer (or result value) that the artificial neural network must infer when the learning data is input to the artificial neural network. The unsupervised learning may refer to a method of learning an artificial neural network in a state where a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
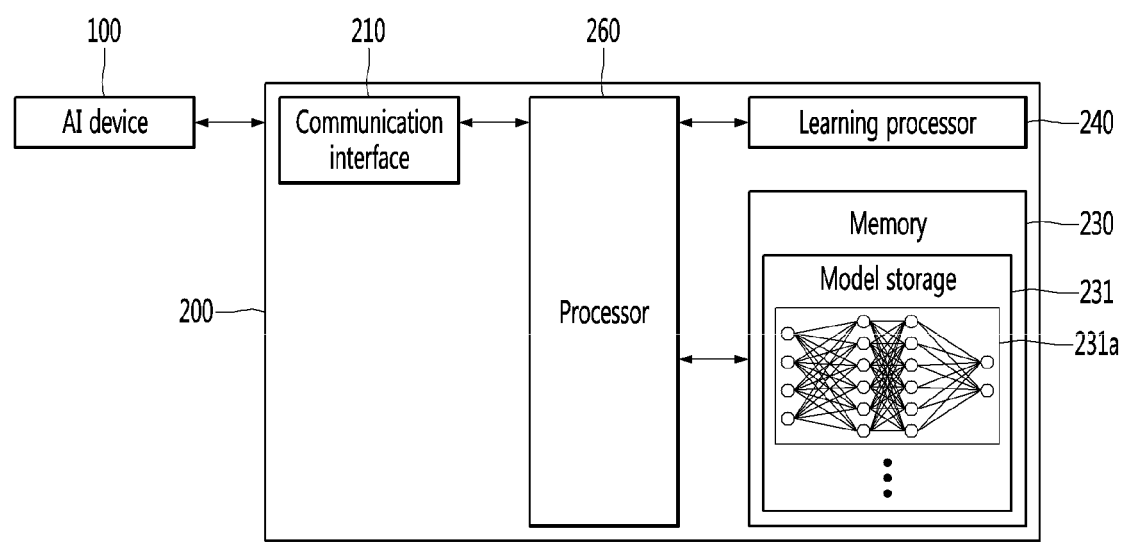
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 may transmit and receive data to and from an external device such as the AI device 100.

The memory 230 may include a model storage 231. The model storage 231 may store a learning or learned model or an artificial neural network 231a through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
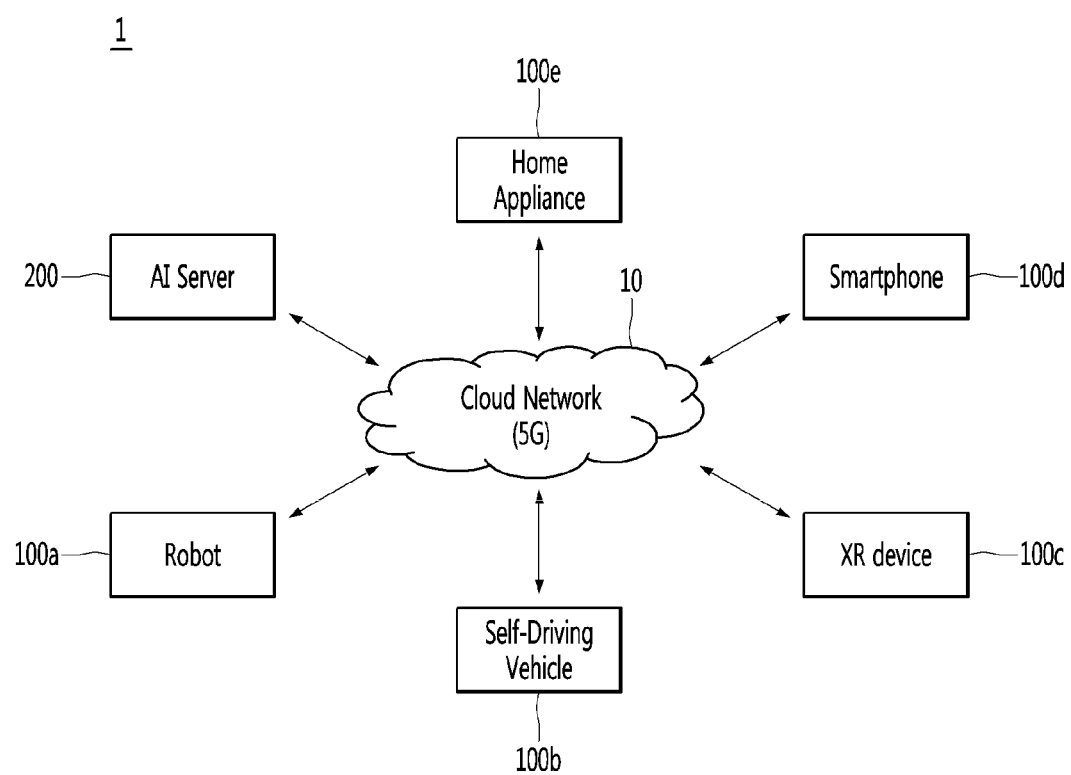
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
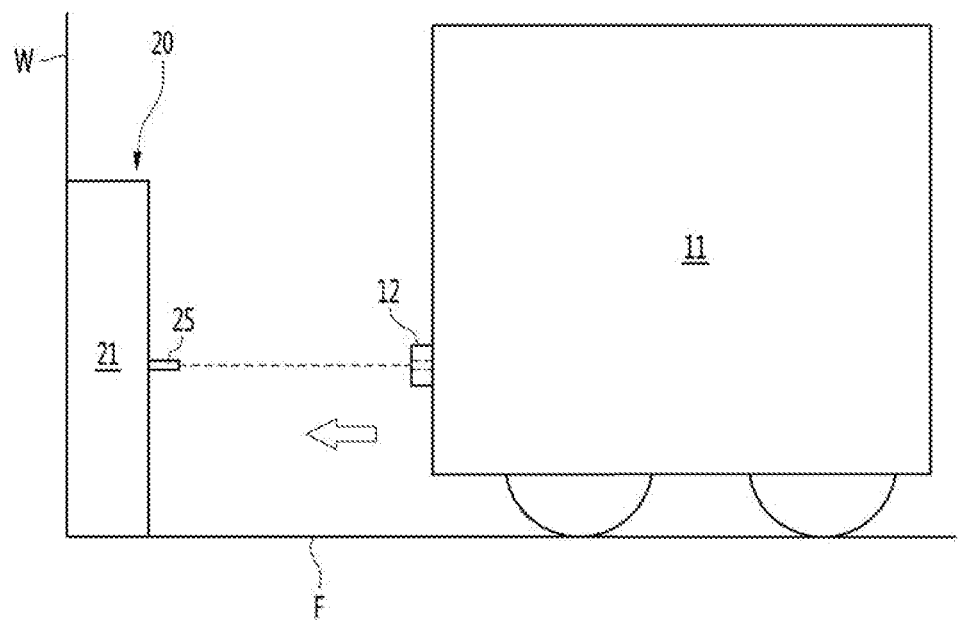
FIG. 4 illustrates that a moving robot is docked to a charging station according to an embodiment of the present disclosure.
Figure 5:
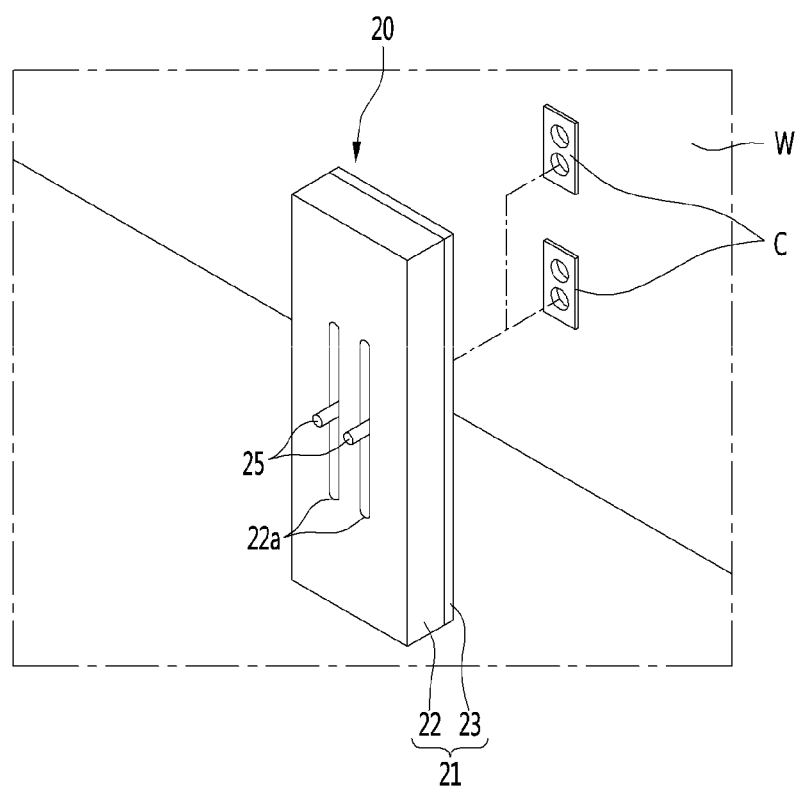
FIG. 5 illustrates that a charging station is installed on a wall according to an embodiment of the present disclosure.

FIG. 4 illustrates that a moving robot is docked in the charging station according to an embodiment of the present disclosure, FIG. 5 illustrates that that the charging station is installed on the wall in accordance with an embodiment of the present disclosure 6 illustrates that the back of the charging station according to an embodiment of the present disclosure.

Figure 6:
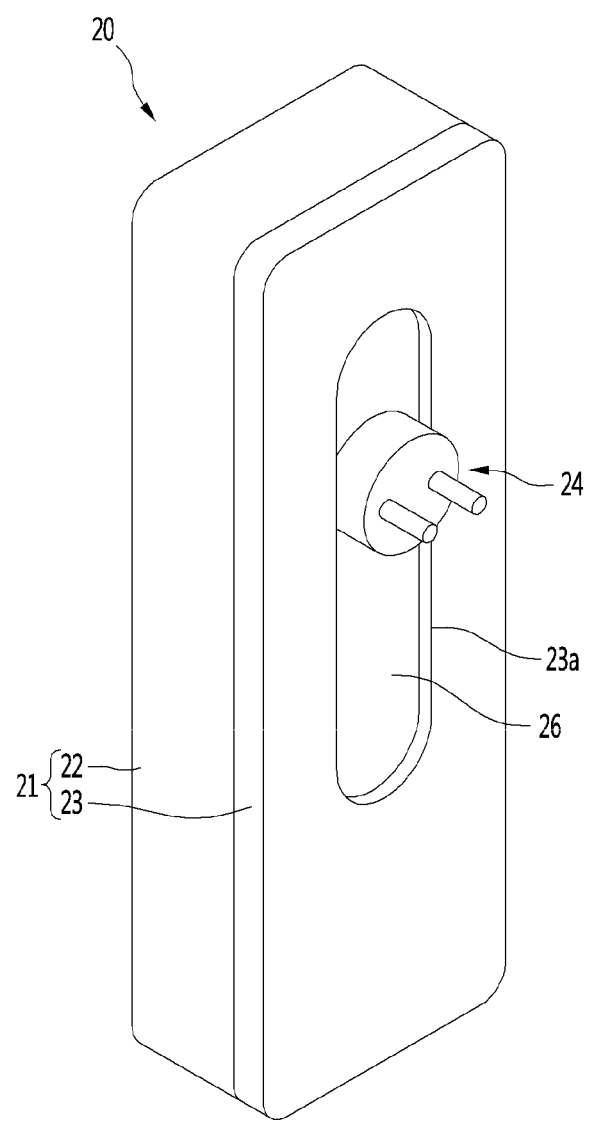
FIG. 6 illustrates a rear surface of a charging station according to an embodiment of the present disclosure.

FIG. 4 illustrates that a moving robot is docked to a charging station according to an embodiment of the present disclosure. FIG. 5 illustrates that a charging station is installed on a wall according to an embodiment of the present disclosure. FIG. 6 illustrates a rear surface of a charging station according to an embodiment of the present disclosure.

The charging station 20 according to the present embodiment may charge the moving robot 11. The moving robot 11 may autonomously travel and may be docked to the charging station 20 so as to be charged. The moving robot 11 may refer to the robot 100*a* or the autonomous vehicle 100*b* described above.

The charging station 20 may include a case 21, a plug 24 (see FIG. 6), and a terminal 25.

The case 21 may form an appearance of the charging station 20. The case 21 may be elongated vertically. The case 21 may be approximately box-shaped. The case 21 may have an internal space.

Hereinafter, for convenience of description, one surface among the outer surfaces of the case 21 facing a wall W is defined as a rear surface, and a surface, among the outer surfaces of the case 21, opposite to the one surface will be defined as a front surface.

The case 21 may include a case body 22 and a cover 23. The rear surface of the case body 22 may be opened, and the cover 23 may cover the open rear surface of the case body 22. However, the present disclosure is not limited thereto, and the front surface of the case body 22 may be opened and the cover 23 may cover the front surface of the case body 22.

Therefore, the inside of the case 21 may be easily maintained and repaired by separating the case body 22 and the cover 23.

The plug 24 may be fitted to an outlet C provided on the wall W. Accordingly, the charging station 20 may be provided with power from an external power source, such as AC grid network. The plug 24 may protrude backward from the case 21. Therefore, the charging station 20 may be installed as close to the wall as possible.

A rear hole 23*a* having a plug 24 may be formed on the rear surface of the case 21. The rear hole 23*a* may be formed on the rear surface of the case cover 23. The rear hole 23*a* may be elongated vertically.

The plug 24 may slide up and down along the rear hole 23*a*. That is, the rear hole 23*a* may guide lifting of the plug 24. Therefore, the charging station 20 may be easily installed regardless of a height of the outlet C provided on the wall W. More specifically, an operator may stably seat the charging station 20 on a bottom surface F in a state where the plug 24 is i-fitted into the outlet C.

In addition, the charging station 20 may further include a rear cover 26 covering the rear hole 23*a*. The rear cover 26 may cover the rear hole 23*a* inside the case 21. As a result, it is possible to prevent moisture or foreign matter from entering the case 21 through the rear hole 23*a*.

The rear cover 26 may be lifted or lowered together with the plug 24. The plug 24 may be fastened to the rear surface of the rear cover 26 and may protrude backward through the rear hole 23*a*. The rear cover 26 may be elongated vertically enough to cover the entire rear hole 23*a* even when the plug 24 is lifted and lowered.

Meanwhile, the moving robot 11 may be docked to the terminal 25. More specifically, a connector 12 of the moving robot 11 may be docked and connected to the terminal 25. The moving robot 11 may approach the charging station 20 in a state where the connector 12 faces the charging station 20, to allow the connector 12 to be docked to the terminal 25. A battery embedded in the moving robot 11 may be charged through the terminal 25 connected to the connector 12.

The terminal 25 may protrude forward from the case 21. More specifically, the terminal 25 may move between a hidden position HP (see FIG. 11) at which the terminal 25 is located in the case 21 and a docking position DP (see FIG. 12) at which the terminal 25 protrudes forward from the case 25.

If the terminal 25 is located at the hidden position HP, the terminal 25 may be hidden in the case 21. Therefore, it is possible to minimize a risk that foreign substances such as moisture or a person comes into contact with the terminal 25. When the terminal 25 is located at the docking position DP, the moving robot may dock to the terminal 25 to perform charging.

The terminal 25 may be provided as a pair. One of the pair of terminals 25 may be a positive terminal and the other may be a negative terminal.

A front hole 22a allowing the terminal 25 to pass therethrough may be provided on a front surface of the case 21. The front hole 22a may be formed on the front surface of the case body 22. The front hole 22a may be elongated vertically. The front hole 22a may be provided as a pair spaced apart from each other laterally in parallel, and a pair of terminals 25 may pass through the pair of front holes 22a, respectively.

The terminal 25 may protrude to a front side of the case 21 through the front hole 22a or may be hidden to the inside of the case 21 through the front hole 22a.

In addition, the terminal 25 may be lifted and lowered along the front hole 22a. That is, the front hole 22a may guide the lifting and lowering of the terminal 25. Therefore, various types of moving robots 11 having the connectors 12 at different heights may be easily docked to the terminal 25.

Figure 7:
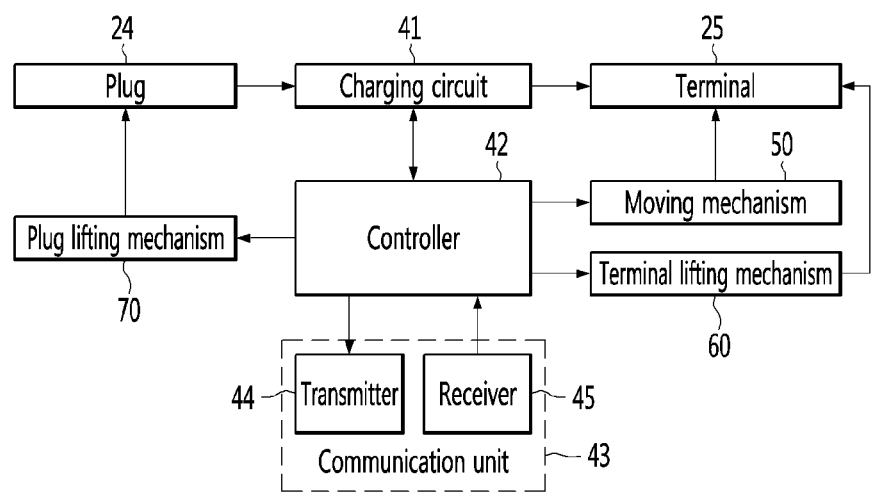
FIG. 7 illustrates a configuration of a charging station according to an embodiment of the present disclosure.
Figure 8:
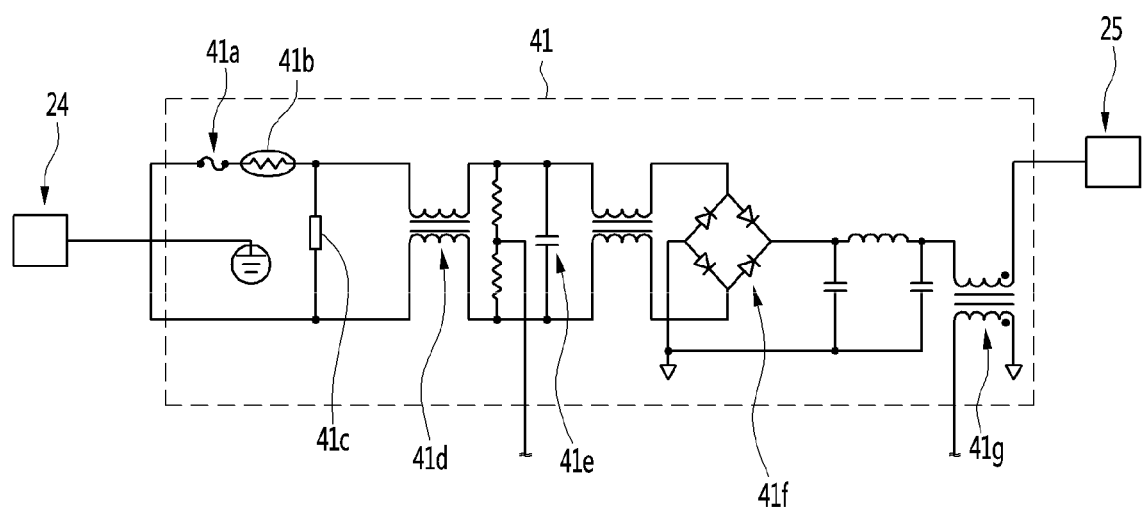
FIG. 8 is a circuit diagram showing an example of a charging circuit according to an embodiment of the present disclosure.

FIG. 7 illustrates a configuration of a charging station according to an embodiment of the present disclosure, and FIG. 8 is a circuit diagram showing an example of a charging circuit according to an embodiment of the present disclosure.

The charging station 20 according to the present embodiment may further include a charging circuit 41, a controller 42, a communication unit 43, a moving mechanism 50, a terminal lifting mechanism 60, and a plug lifting mechanism 70.

The charging circuit 41 may be embedded in the case 21. The charging circuit 41 may be electrically connected to the plug 24 and the terminal 25. The charging circuit 41 may receive power introduced from the outside through the plug 24 and charge the battery of the moving robot 11 through the terminal 25.

The circuit configuration of the charging circuit 41 is not limited to the circuit diagram shown in FIG. 8 and may be appropriately modified by those skilled in the art as necessary.

As an example, the charging circuit 41 may include a fuse 41a, a temperature sensor 41b, a varistor 41c, a line filter 41d, and a rectifier diode 41e, and a coil 41f. The components included in the charging circuit 41 may be added, deleted or changed as necessary.

The fuse 41a may interrupt a flow of current when excessive current is applied through plug 24. The fuse 41a may be configured to interrupt a current when the current larger than a set current flows.

The temperature sensor 41b may detect a temperature of the charging circuit 41. The fuse 41a may be configured to interrupt the current when a detected temperature of the temperature sensor 41b is higher than a preset temperature. As a result, the charging circuit 41 may be prevented from being overheated.

The varistor 41c may be a resistor in which a resistance value changes non-linearly according to an applied voltage. Therefore, the varistor 41c may protect the charging circuit 41 to which an excessive voltage is applied.

The line filter 41d may cancel noise that enters the charging circuit 41 from the plug 24.

The rectifying diode 41e may rectify an alternating current (AC) applied through the plug 24 to a direct current (DC). The rectifier diode 41e may rectify commercial AC to a DC.

The coil 41f may be connected to the terminal 25 and may guide the DC rectified by the rectifier diode 41e to the terminal 25.

The charging circuit 41 and each of the components included therein are well-known components, and thus, a detailed description thereof will be omitted.

The controller 42 may include at least one processor. The controller 42 may be embedded in the case 21 but is not limited thereto.

The controller 42 may communicate with the charging circuit 41 to control the charging circuit 41. The controller 42 may control the charging circuit to start or stop charging of the moving robot. The controller 42 may control the charging circuit 41 to perform charging by varying a charging current and a charging voltage according to a battery state of the moving robot.

The communication unit 43 may communicate with the moving robot 11. That is, the moving robot 11 may have a communication unit 43 communicating with the communication unit 43 of the charging station 20.

The communication unit 43 may be a short-range wireless communication device. For example, the communication unit 43 may perform communication according to at least one of Bluetooth, Wi-Fi, ZigBee, near-field communication (NFC), and infrared data association (IrDA).

The communication unit 43 may include a transmitter 44 transmitting information to the moving robot and a receiver 45 receiving information from the moving robot. For example, if the communication unit 43 uses IrDA, the transmitter 44 may be an infrared transmitter and the receiver 45 may be an infrared receiver.

The controller 42 may control the communication unit 43. More specifically, the controller 42 may communicate with the transmitter 44 and transmit information related to the charging station 20 to the moving robot 11 via the transmitter 44. The controller 42 may communicate with the receiver 45 and receive information transferred to the receiver 45 from the moving robot 11.

The controller 42 may control the moving mechanism 50. The moving mechanism 50 may move the terminal 25 back and forth. More specifically, the moving mechanism 50 may move the terminal 25 between the hidden position HP (see FIG. 11) and the docking position DP (see FIG. 12).

The controller 42 may control the terminal lifting mechanism 60. The terminal lifting mechanism 60 may lift and lower the terminal 25 up and down. That is, the terminal lifting mechanism 60 may adjust a height of the terminal 25.

The controller 42 may control the plug lifting mechanism 70. The plug lifting mechanism 70 may slide the plug 24 up and down. That is, the plug lifting mechanism 70 may adjust a height of the plug 24.

However, the charging station 20 may not include the plug lifting mechanism 70 and an operator may manually adjust the height of the plug 24.

Figure 9:
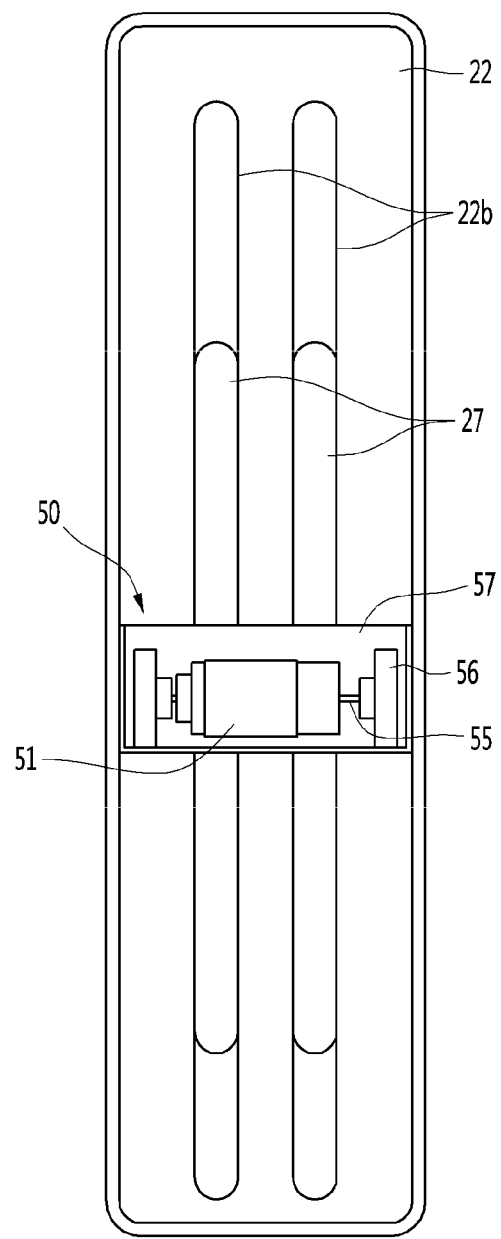
FIG. 9 illustrates an inside of a case viewed from the rear according to an embodiment of the present disclosure.
Figure 10:
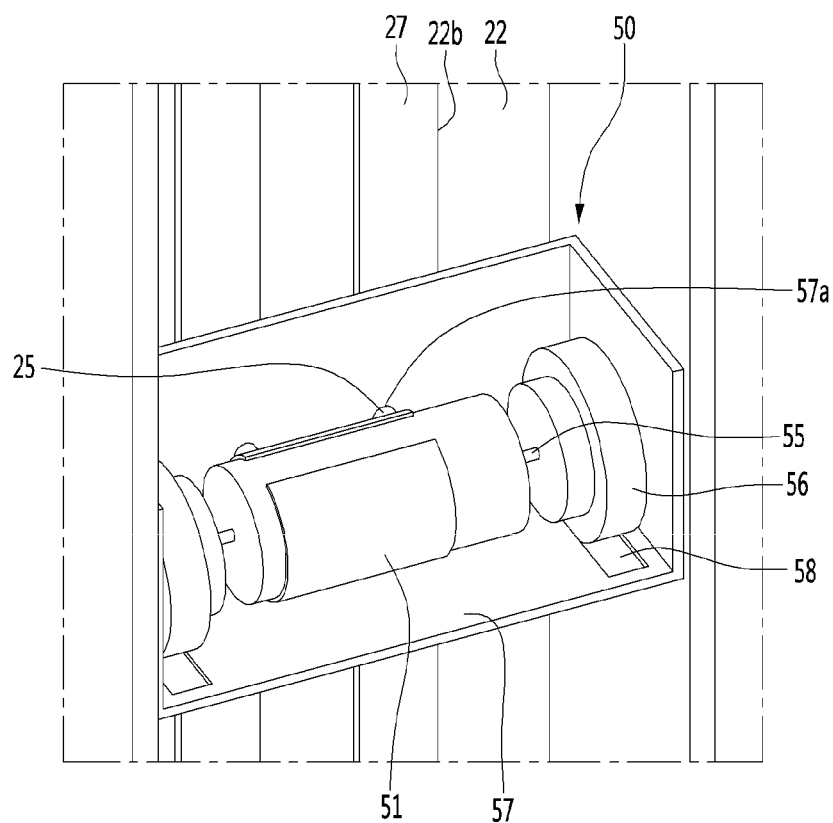
FIG. 10 is an enlarged view of a moving mechanism and its periphery shown in FIG. 9.
Figure 11:
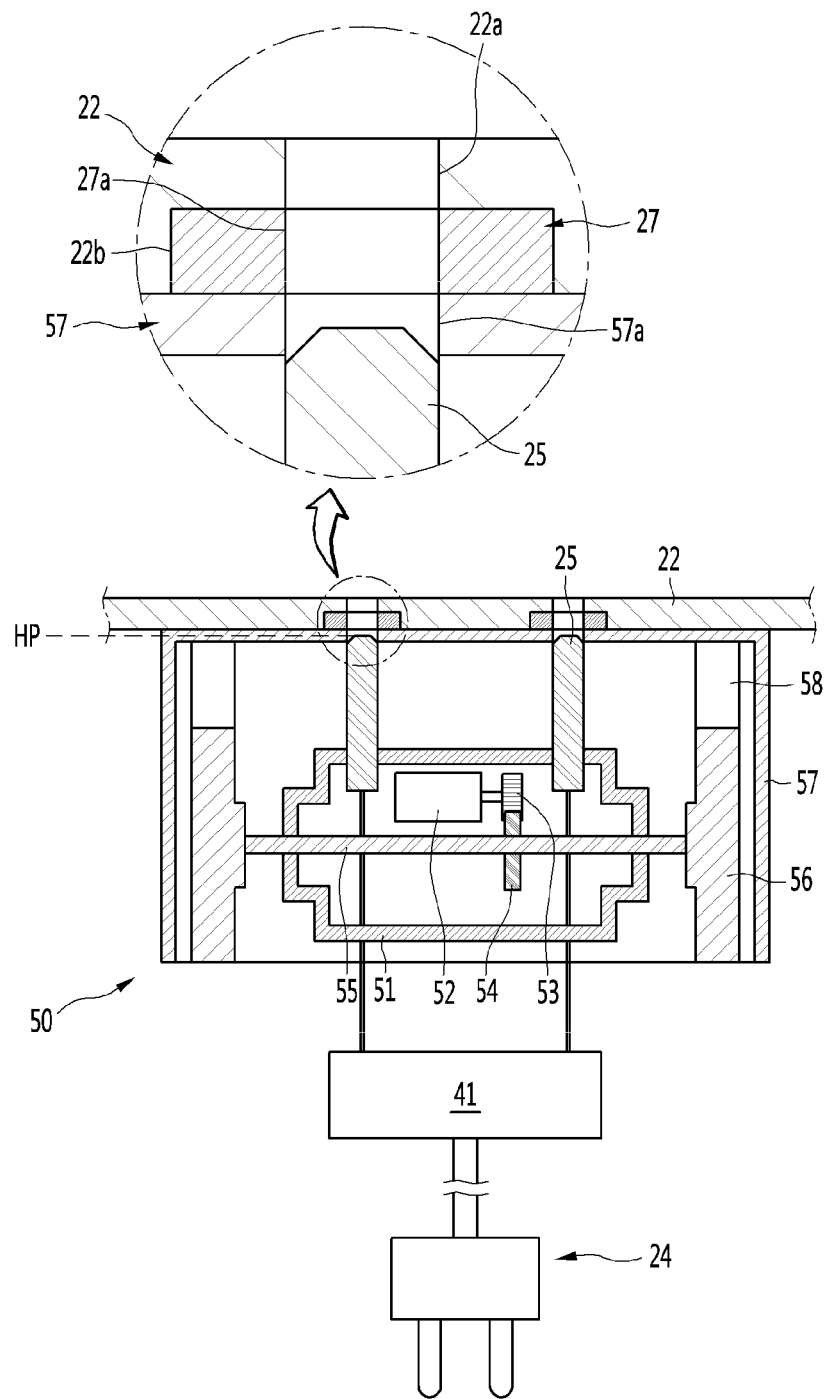
FIGS. 11 and 12 are cross-sectional views illustrating a configuration and operation of a moving mechanism according to an embodiment of the present disclosure.
Figure 12:
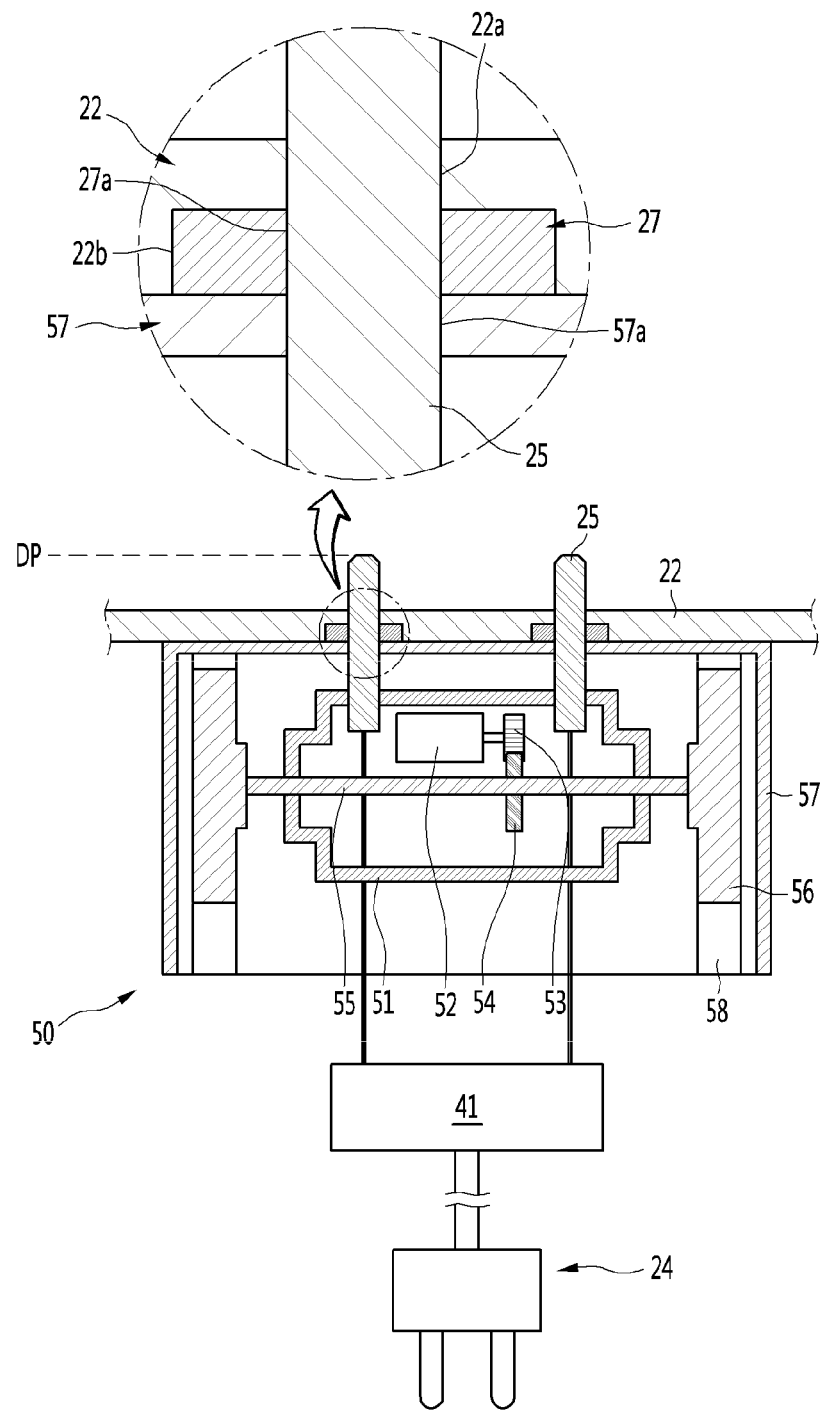

FIG. 9 illustrates an inside of a case viewed from the rear according to an embodiment of the present disclosure, FIG. 10 is an enlarged view of a moving mechanism and its periphery shown in FIG. 9, and FIGS. 11 and 12 are cross-sectional views illustrating a configuration and operation of a moving mechanism according to an embodiment of the present disclosure.

The charging station 20 may further include a front cover 27 that covers the front hole 22a (see FIG. 5). The front cover 27 may cover the front hole 22a on an inner side of the case 20. As a result, intrusion of moisture or foreign matter into the case 21 through the front hole 22a may be prevented.

The front cover 27 may be provided as a pair covering the pair of front holes 22a, respectively. The pair of front covers 27 may be spaced apart from each other laterally in parallel.

The front cover 27 may be lifted and lowered together with the terminal 25. More specifically, the front cover 27 may be fastened to a supporter 57 of the terminal lifting mechanism 50 and lifted and lowered together with the terminal 25.

The front cover 27 may be elongated vertically enough to cover the entire front hole 22a even if the terminal 25 is lifted or lowered.

The front cover 27 may have a through hole 27a (see FIG. 11) through which the terminal 25 passes. The through hole 27a may communicate with the front hole 22a. The terminal 25 may sequentially pass through the through hole 27a and the front hole 22a to protrude to the front side of the case 21.

A guide groove 22b communicating with the front hole 22a and guiding lifting and lowering of the front cover 27 may be provided on an inner surface of the case 21. The guide groove 22b may be formed by depressing a front inner surface of the case 21 forward. The front cover 27 may be lifted and lowered in a state where the front cover 27 is inserted in the guide groove 22b.

The guide groove 22b may be elongated vertically. A vertical length of the guide groove 22b may be longer than a vertical length of the front cover 27.

The guide groove 22b may be provided as a pair for guiding the pair of front covers 27, respectively. The pair of guide grooves 22b may be spaced apart from each other laterally in parallel.

Hereinafter, a configuration of the moving mechanism 50 will be described in detail.

As described above, the moving mechanism 50 may move the terminal 25 between the hidden position HP and the docking position DP. The moving mechanism 50 may be embedded in the case 21.

As shown in FIG. 11, when the terminal 25 is located at the hidden position HP, the terminal 25 may be located in the case 21 to minimize exposure to the outside. As shown in FIG. 12, when the terminal 25 is located at the docking position DP, the terminal 25 may protrude to the front side of the case 21 and the moving robot 11 may be docked.

More specifically, the moving mechanism 50 may include a housing 51, a motor 52, a shaft 55, a wheel 56, and a supporter 57.

The housing 51 may have a cylindrical shape elongated substantially laterally. An internal space may be provided in the housing 51.

The housing 51 may be connected to the terminal 25. Thus, the terminal 25 may move back and forth with the housing 51.

The motor 52 may be located inside the housing 51. A rotary shaft of the motor 52 may be elongated laterally. The motor 52 may be controlled by the controller 42 (see FIG. 7).

The shaft 55 may be rotated by the motor 52. More specifically, a rotational force of the motor 52 may be transferred to the shaft 55 by a plurality of gears 53 and 54. For example, the plurality of gears 53 and 54 may include a driver gear 53 connected to a rotary shaft of the motor 52 and a driven gear 54 in mesh with the prime gear 53 and rotating together with the shaft 55. The driven gear 54 may be fastened to the shaft 55.

However, the present disclosure is not limited thereto, and the shaft 55 may be directly connected to the motor 52.

The shaft 55 may be elongated laterally. The shaft 55 may penetrate through the housing 51. A horizontal length of the shaft 55 may be longer than a horizontal length of the housing 51.

Both ends of the shaft 55 may be connected to a wheel 56, and the wheel 56 may rotate together with the shaft 55. That is, the shaft 55 may act as a driving shaft of the wheel 56. The wheel 56 may be provided as a pair connected to both ends of the shaft 55, respectively.

The supporter 57 may have a box shape in which an upper surface and a rear surface are open. More specifically, the supporter 57 may include a horizontal lower panel, a pair of side panels vertically connected to both ends of the lower panel, and a front surface connected to a front end of the lower panel and connecting the pair of side panels.

The housing 51, the shaft 55, and the wheel 56 may be located inside the supporter 57. More specifically, the housing 51, the shaft 55 and the wheel 56 may be located between the pair of side panels and may be located above the lower panel.

The supporter 57 may support the wheel 56, and the wheel 56 may roll in a state of being in contact with the supporter 57. Accordingly, the housing 51 and the terminal 25 connected to the housing 51 may move back and forth according to a rotation direction of the wheel 56.

More specifically, the supporter 57 may have a step groove 58 with which the wheel 56 is in contact. The step groove 58 may be elongated in a front-rear direction on an upper surface of the lower plate. The step groove 58 may be stepped downward from an upper surface of the lower plate. The step groove 58 may guide advancing and reversing of the wheel 56.

The step groove 58 may be provided as a pair with which a pair of wheels 56 in contact. The pair of stepped grooves 58 may be spaced apart from each other laterally in parallel.

In order for the wheel 56 to smoothly roll without slipping with respect to the supporter 57, a belt formed of a material having a high frictional force may be mounted around the wheel 56.

As described above, the supporter 57 may be fastened to the front cover 27.

The supporter 57 may have an opening 57a through which the terminal 25 passes. The opening 57a may penetrate through the front end and rear of the supporter 57. That is, the opening 57a may be formed on the front panel.

The opening 57a may communicate with a through hole 27a of the front cover 27. The opening 57a may be located at the rear of the through hole 27a. The opening 57a may be provided as a pair that communicate with the pair of through holes 27a, respectively.

Hereinafter, the operation of the moving mechanism 50 will be described.

When the motor 52 rotates the shaft 55 and the wheel 56 in one direction (e.g., clockwise direction), the housing 51 and the terminal 25 connected to the housing 51 may move forward. As shown in FIG. 12, the terminal 25 may protrude to the front side of the case 21 by sequentially passing through the opening 57a of the supporter 57, the through hole 27a of the front cover 27, and the front hole 22a of the case 21. It may pass through and protrude forward of the case 21.

The terminal 25 may advance to a predetermined docking position DP.

When the motor 52 rotates the shaft 55 and the wheel 56 in the opposite direction (e.g., counterclockwise direction), the housing 51 and the terminal 25 connected to the housing 51 may move backward. As shown in FIG. 11, the terminal 25 may enter the inside of the case 21 and may not protrude to the front side of the case 21. Even when the end of the terminal 25 is located in the front hole 22a, it may be defined that the terminal 25 is located inside the case 21.

The terminal 25 may back backward up to the predetermined hidden position HP.

Meanwhile, as shown in FIGS. 11 and 12, the charging circuit 41 may be electrically connected to the terminal 25 and the plug 24. The charging circuit 41 may be embedded in the case 21. FIGS. 11 and 12 illustrate a state in which the charging circuit 41 is located at the rear of the moving mechanism 50 but is not limited thereto. The charging circuit 41 may be located above or below the moving mechanism.

An electric wire connecting the charging circuit 41 and the terminal 25 may apply a current directly to the connector 12. However, if the housing 51 is a conductor, the electric wire may also apply a current to the terminal 25 via the housing 51.

The electric wire connecting the charging circuit 41 and the terminal 25 may be elongated sufficiently. Accordingly, even if the terminal 25 is lifted or lowered or move forward and backward, electrical connection between the charging circuit 41 and the terminal 25 may be easily maintained.

The electric wire connecting the charging circuit 41 and the plug 24 may be elongated sufficiently. Accordingly, even if the plug 24 is lifted and lowered or move in a front-rear direction, electrical connection between the charging circuit 41 and the plug 24 may be easily maintained.

Figure 13:
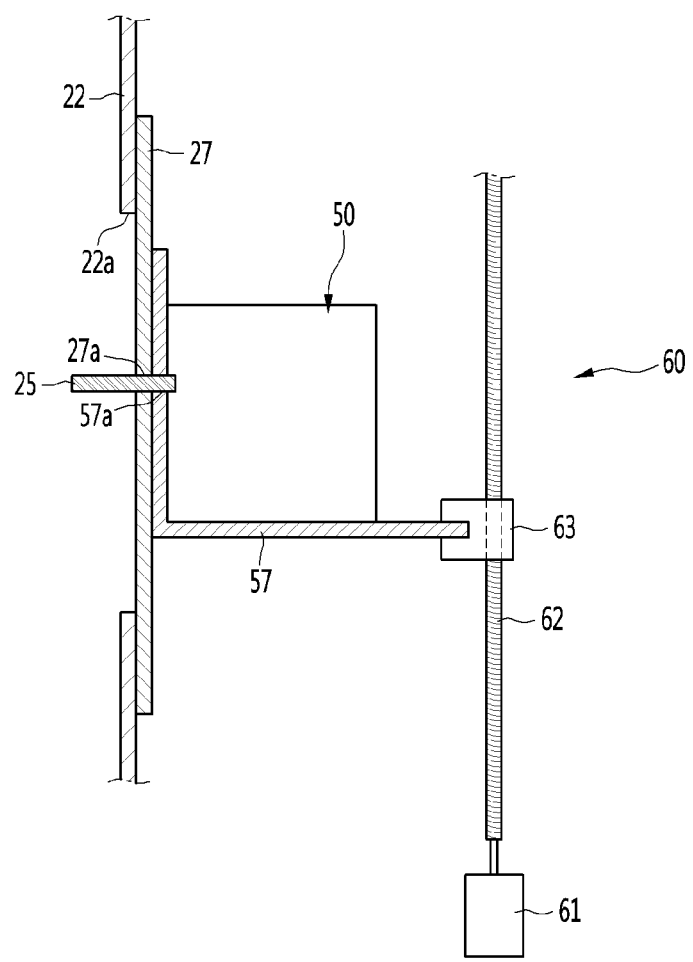
FIG. 13 illustrates an example of a terminal lifting mechanism.

FIG. 13 illustrates an example of a terminal lifting mechanism.

The terminal lifting mechanism 60 may lift and lower the terminal 25 and the moving mechanism 50. The terminal lifting mechanism 60 may be embedded in the case 21.

More specifically, the terminal lifting mechanism 60 may include a motor 61, a lead screw 62, and a bracket 63.

The motor 61 may be connected to the lead screw 62 and rotate the lead screw 62. A rotary shaft of the motor 61 may be disposed vertically. The motor 61 may be connected to a lower end of the lead screw 62.

The lead screw 62 may be provided vertically. The lead screw 62 may be rotated by the motor 61. Male threads may be formed on an outer circumference of the lead screw 62.

The bracket 63 may be fastened to the supporter 57 and may be lifted and lowered along the lead screw 62. The bracket 63 may have a connection hole through which the lead screw 62 passes. A female thread corresponding to a male thread formed on an outer circumference of the lead screw 62 may be formed on an inner circumference of the connection hole. Accordingly, when the lead screw 62 rotates in one direction, the bracket 63 may be lifted together with the supporter 57, and when the lead screw 62 rotates in the opposite direction, the bracket 63 may be lowered with the supporter 57. That is, the moving mechanism 50 and the terminal 25 connected to the moving mechanism 50 may be lifted and lowered together with the bracket 63.

In addition, since the front cover 27 is fastened to the supporter 57, the front cover 27 may also be lifted and lowered together with the moving mechanism 50 and the terminal 25.

However, the method of the terminal lifting mechanism 60 is not limited to the above configuration.

In one example, the terminal lifting mechanism 60 may include a worm wheel rotated by a motor, a worm engaged with the worm wheel, and a vertical shaft rotating to be lifted and lowered together with the worm. The vertical shaft may be fastened to the supporter 57.

As another example, the terminal lifting mechanism 60 may include a pinion rotated by a motor, a rack engaged with the pinion, and a vertical bar fastened to the rack and lifted and lowered. The vertical bar may be fastened to the supporter 57.

Figure 14:
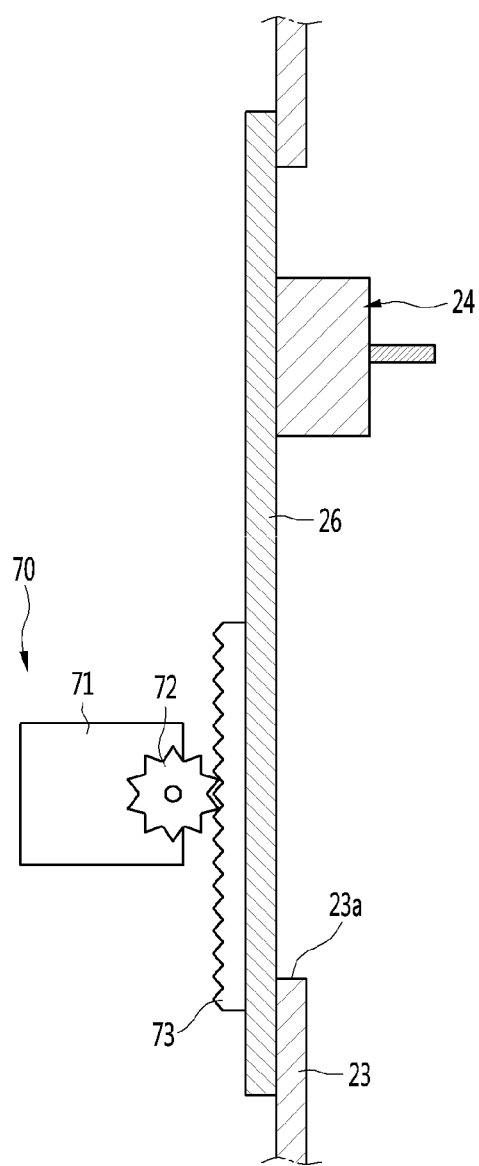
FIG. 14 illustrates an example of a plug lifting mechanism.

FIG. 14 illustrates an example of a plug lifting mechanism.

The plug lifting mechanism 70 may lift and lower the plug 24 and the rear cover 26. The plug lifting mechanism 70 may be embedded in the case 21.

More specifically, the plug lifting mechanism 70 may include a motor 71, a pinion 72, and a rack 73.

The motor 71 may be connected to the pinion 72 and rotate the pinion 72. A rotary shaft of the motor 71 may be disposed horizontally.

The pinion 72 may be engaged with the rack 73. The rack 73 may be fastened to the front of the rear cover 26. The rack 73 may be elongated vertically.

Thus, when the pinion 72 rotates in one direction, the rack 73 may be lifted together with the rear cover 26, and when the pinion 72 rotates in the opposite direction, the rack 73 may be lowered together with the rear cover 26. That is, the rear cover 26 and the plug 24 connected to the rear cover 26 may be lifted and lowered together with the rack 73.

However, the method of the plug lifting mechanism 70 is not limited to the above configuration. In one example, the plug lifting mechanism 70 may include a lead screw rotated by a motor and a bracket lifted along the lead screw and fastened to the rear cover 26.

Figure 15:
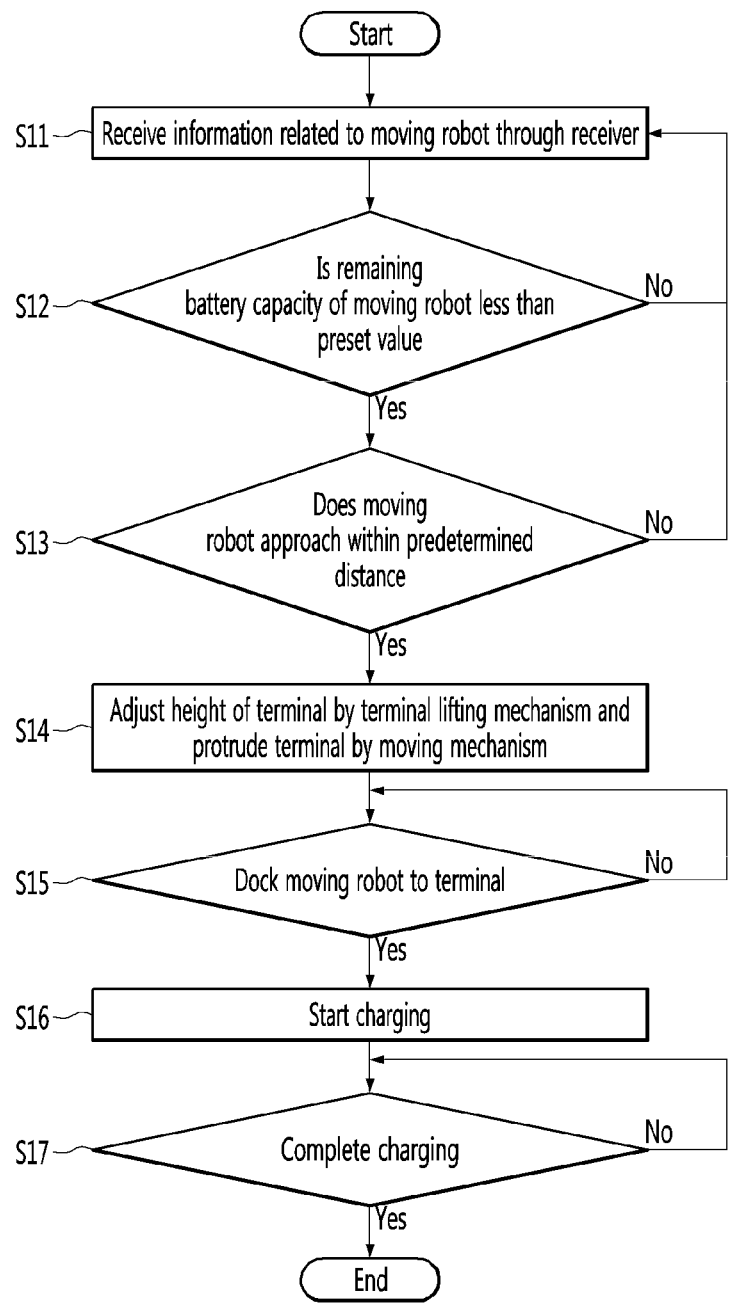
FIG. 15 is a flowchart illustrating a simplified control sequence of a charging station according to an embodiment of the present disclosure.

FIG. 15 is a flowchart illustrating a simplified control sequence of a charging station according to an embodiment of the present disclosure.

The control sequence shown in FIG. 15 is an example, and each step included in the control method may be added, deleted, and changed. In addition, two or more steps may be performed simultaneously or the order of implementation may be changed.

The receiver 45 of the communication unit 43 may receive information related to the moving robot 11 from the moving robot 11 (S11). The information related to the moving robot 11 may include type information of the moving robot 11, location information, and battery information.

The controller 42 may determine if the remaining battery capacity of the moving robot 11 is less than a preset value (S12). If the remaining battery capacity of the moving robot 11 is less than a preset value, then the controller 42 may determine if the moving robot 11 approached within a predetermined distance (S13).

The controller 42 may recognize a height of the connector 12 provided in the moving robot 11 from the type information of the moving robot 11.

The controller 42 may recognize an approaching distance of the moving robot 11 with respect to the charging station 20 from the position information of the moving robot 11 (S13).

The controller 42 may adjust the height of the terminal 25 by using the terminal lifting mechanism 60 and may protrude the terminal 25 by using the moving mechanism 50 (S14)

The controller 42 may recognize a status and remaining capacity of the battery embedded in the moving robot 11 from battery information of the moving robot 11.

The controller 42 may move the terminal 25 to the docking position DP when the remaining battery capacity of the moving robot 11 is less than a preset value and the moving robot 11 approaches within a preset distance (S12) (S13) (S14).

More specifically, the controller 42 may control the terminal lifting mechanism 60 to lift and lower the terminal 25 to a height corresponding to the connector 12 provided in the moving robot 11. In addition, the controller 42 may control the moving mechanism 50 to allow the terminal 25 to protrude to the front side of the case 21 (S14).

Thus, the connector 12 of the moving robot 11 may be smoothly docked to the terminal 25.

However, regardless of the remaining battery capacity of the moving robot 11, when the moving robot 11 approaches within the preset distance, the terminal 25 may control the terminal 25 to be moved to the docking position (DP).

When the moving robot 11 is docked to the terminal 25 (S15), the controller 42 may control the charging circuit 41 to start charging (S16). The controller 42 may control the charging circuit 41 to perform charging by varying a charging current and a charging voltage according to a battery status of the moving robot 11 and a remaining battery capacity.

The controller 42 may terminate the charging when the charging of the moving robot 11 is completed (S17). Thereafter, the moving robot 11 may be separated from the terminal 25, and the controller 42 may control the moving mechanism 50 to move the terminal 25 to the hidden position HP.

By the control, the terminal 25 may be normally hidden in the case 21 and protrude from the case 21 only when the moving robot is charged. As a result, it is possible to minimize a risk of foreign matters such as moisture or the like coming into contact with the terminal 25 at normal times.

Figure 16:
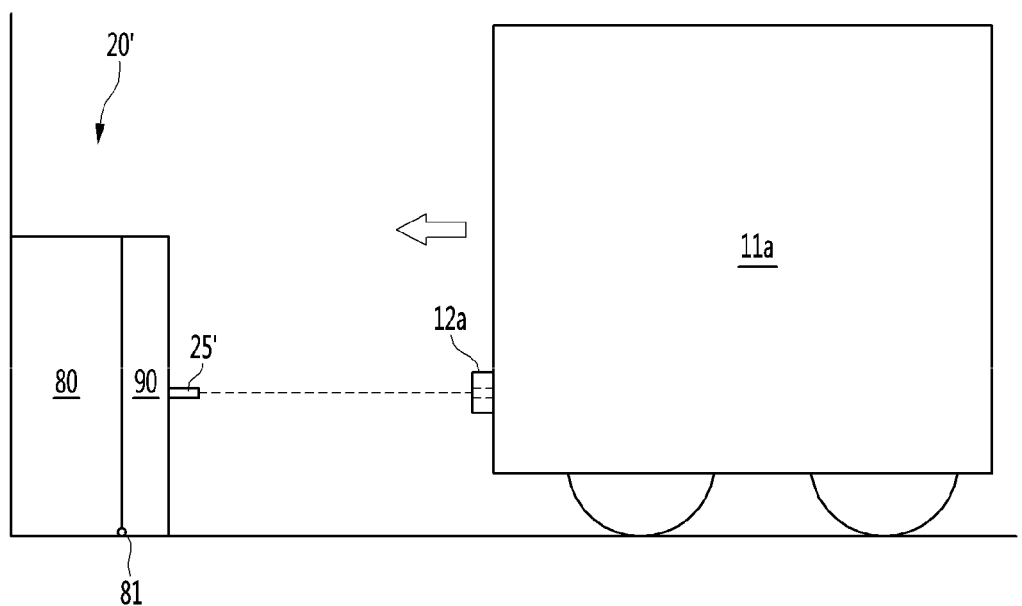
FIG. 16 illustrates that a first type moving robot is docked to a charging station according to another embodiment of the present disclosure.
Figure 17:
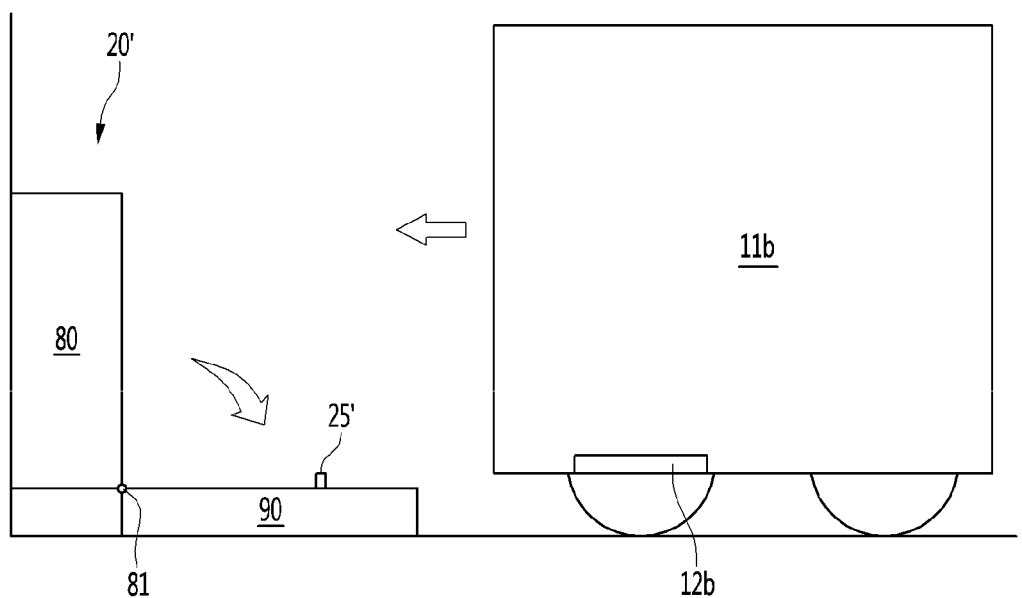
FIG. 17 illustrates that a second type moving robot is docked to a charging station shown in FIG. 16.
Figure 18:
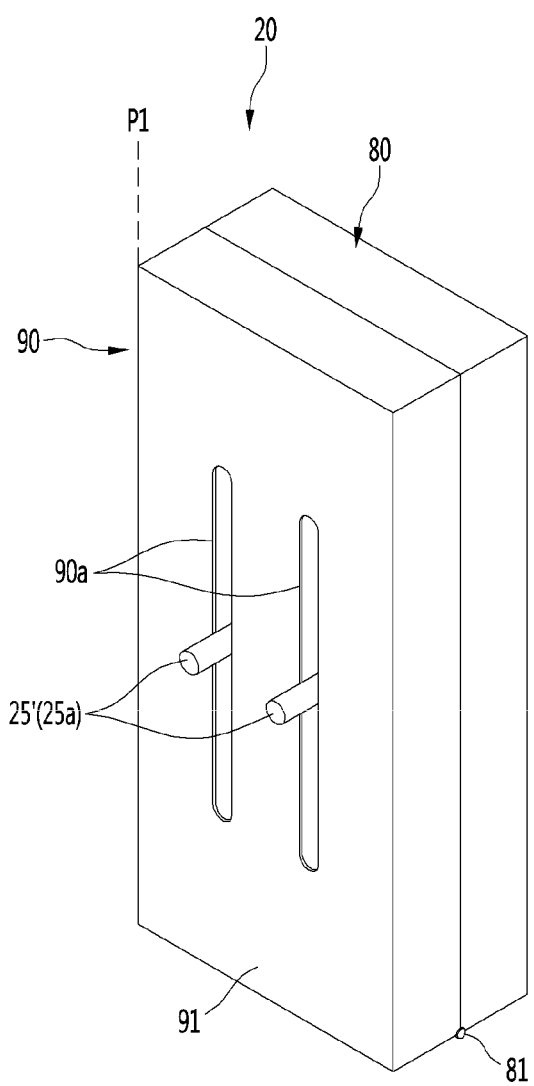
FIG. 18 is a perspective view of a charging station according to another embodiment of the present disclosure.
Figure 19:
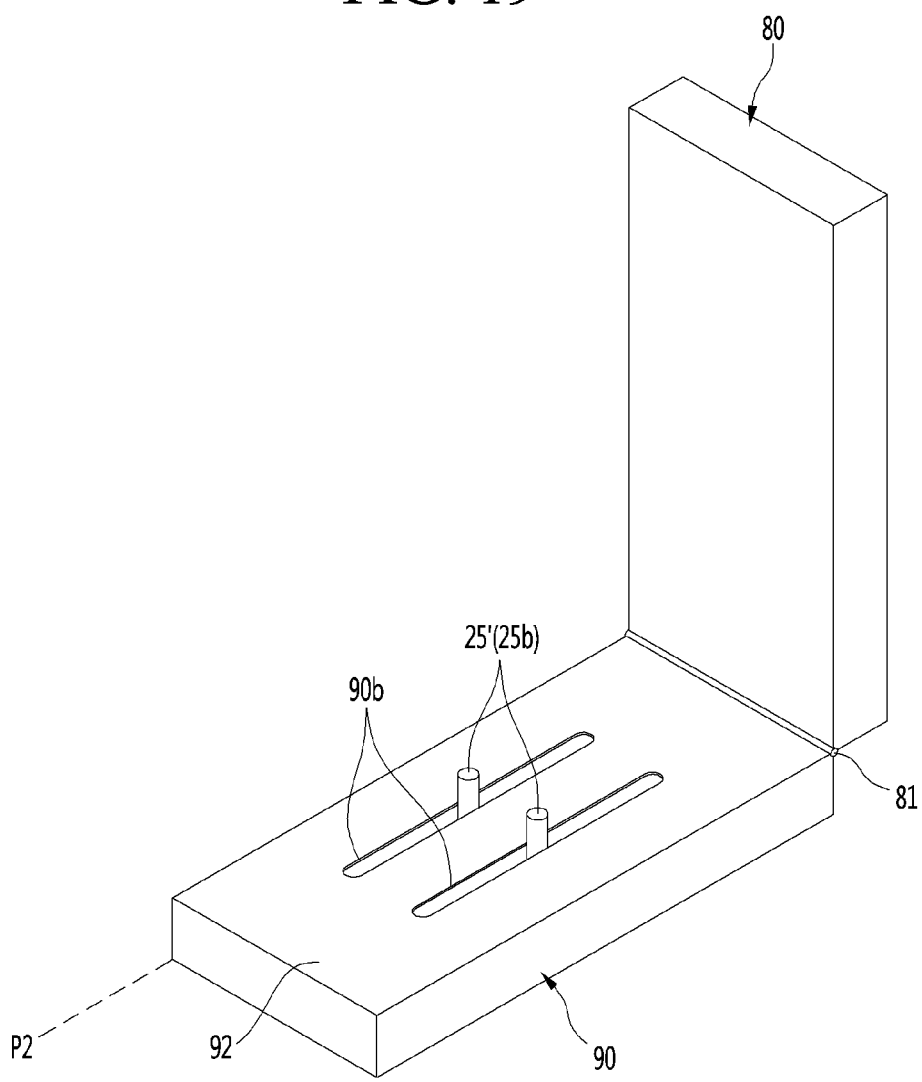
FIG. 19 is a perspective view showing a state in which a second case shown in FIG. 18 is unfolded.
Figure 20:
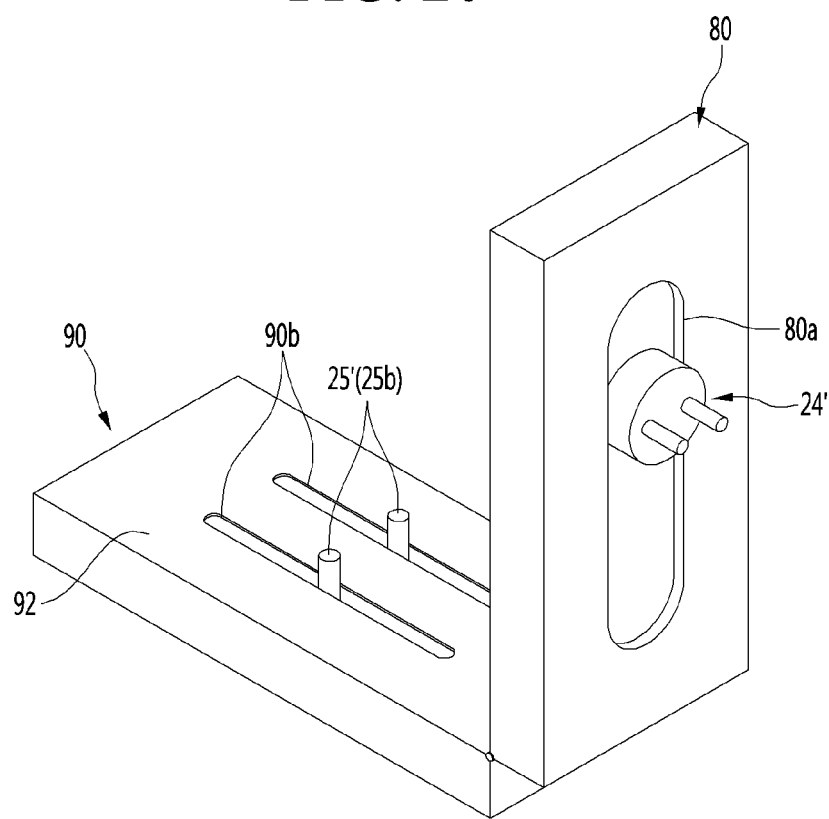
FIG. 20 is a perspective view of a charging station according to another embodiment of the present disclosure, viewed from another direction.

FIG. 16 illustrates that a first type moving robot is docked to a charging station according to another embodiment of the present disclosure. FIG. 17 illustrates that a second type moving robot is docked to a charging station shown in FIG. 16. FIG. 18 is a perspective view of a charging station according to another embodiment of the present disclosure. FIG. 19 is a perspective view showing a state in which a second case shown in FIG. 18 is unfolded. FIG. 20 is a perspective view of a charging station according to another embodiment of the present disclosure, viewed from another direction.

Hereinafter, repeated contents with the above-described embodiment will be omitted and a description will be mainly focused on differences.

The charging station 20' according to this embodiment may charge the moving robot 11a and 11b. The moving robots 11a and 11b may autonomously travel and may be docked to the charging station 20' so as to be charged. The moving robots 11a and 11b may refer to the robot 100a or the autonomous vehicle 100b described above.

The moving robots 11a and 11b may be divided into a first type moving robot 11a and a second type moving robot 11b according to the position of the connector 12a and 12b. The connector 12a of the first type moving robot 11a may be provided on the rear surface of the first type moving robot 11a and may face backward. The connector 12b of the second type moving robot 11b may be provided on the bottom of the second type moving robot 11b and may face downward.

The charging station 20' may include a first case 80, a second case 90, a plug 24' and a terminal 25'.

The first case 80 and the second case 90 may form the appearance of the charging station 20'. The first case 80 and the second case 90 may be elongated vertically. The first case 80 and the second case 90 may have a substantially box shape. Internal spaces may be formed in the first case 80 and the second case 90.

The first case 80 and the second case 90 may be hinged to each other.

More specifically, the hinge shaft 81 (see FIG. 19) connecting the first case 80 and the second case 90 may be elongated in a horizontal direction. The hinge shaft 81 may connect a lower front surface of the first case 80 and a lower rear surface of the second case 90.

The second case 90 may rotate between a first position P1 at which the second case 90 covers the front surface of the first case 80 and a second position P2 at which the second case 90 is horizontally disposed after rotating downward from the first position P1. The first position P1 may refer to a position where the second case 90 is erected, and the second position P2 may refer to a position where the second case 90 is laid down.

The internal space of the first case 80 and the internal space of the second case 90 may communicate with each other. For example, the hinge shaft 81 may have a communication hole (not shown) allowing the internal space of the first case 80 and the internal space of the second case 90 to communicate with each other. Accordingly, a component embedded in the first case 80 and a component embedded in the second case 90 may be electrically connected by an electric wire passing through the communication hole.

The plug 24' may protrude backward from the first case 80. A rear hole 80a having a plug 24' may be formed on a rear surface of the first case 80. The rear hole 80a may be elongated vertically. The plug 24' may slide up and down along the rear hole 80a. That is, the rear hole 80a may guide lifting and lowering of the plug 24'.

The plug lifting mechanism 70 (see FIG. 7) may be embedded in the first case 80. The plug lifting mechanism 70 may lift and lower the plug 24'.

In addition, the charging circuit 41 (see FIG. 7) may be embedded in the first case 80 or the second case 90. In order to make the second case 90 slim, the charging circuit 41 is preferably embedded in the first case 80.

Meanwhile, the moving robot 11a or 11b may be docked to the terminal 25'. More specifically, the connector 12a or 12b of the moving robots 11a or 11b may be docked and connected to the terminal 25'. The battery embedded in the moving robot 11a or 11b may be charged through the terminal 25' connected to the connector 12a or 12b.

Terminal 25' may protrude outward from the second case 90. More specifically, the terminal 25' may move between a hidden position at which the terminal 25' is located in the second case 90 and a docking position at which the terminal 25' protrudes outward from the second case 90.

The docking position may vary depending on the position of the second case 90.

More specifically, if the second case 90 is located at the first position P1, the terminal 25' may protrude to the front side of the second case 90 and the first type moving robot 11a may be docked to terminal 25'.

If the second case 90 is located at the second position P2, the terminal 25' may protrude to an upper side of the second case 90 and the second type moving robot 11b may be docked to the terminal 25'.

Both sides of the second case 90 may have holes 90a and 90b through which the terminal 25' passes. More specifically, a first hole 90a may be formed on the first surface 91 of the second case 90, and a second hole 90b may be formed on the second surface 92 of the second case 90.

When the second case 90 is located at the first position P1, the first surface 91 may face forward and the second surface 92 may face backward. When the second case 90 is located at the second position P2, the first surface 91 may face downward and the second surface 92 may face upward.

The holes 90a and 90b may be elongated in one direction. The one direction may be an up-down direction (i.e., a vertical direction) when the second case 90 is located at the first position P1, and may be a front-rear direction when the second case 90 is located at the second position P2.

Each of the first hole 90a and the second hole 90b may be provided as a pair spaced apart from each other in parallel.

If the second case 90 is located at the first position P1, the terminal 25' may protrude to the front side of the second case 90 through the first hole 90a or may be hidden inside the second case 90 through the first hole 90a.

If the second case 90 is located at the second position P2, the terminal 25' may protrude to an upper side of the second case 90 through the second hole 90b or may be hidden inside the second case 90 through the second hole 90b.

The terminal lifting mechanism 60 (see FIG. 7) described above may be embedded in the second case 90.

When the second case 90 is located at the first position P1, the terminal lifting mechanism 60 may move the terminal 25 up and down. The first hole 90a may guide the vertical movement of the terminal 25'.

When the second case 90 is located at the second position P2, the terminal lifting mechanism 60 may move the terminal 25' back and forth. The second hole 90b may guide the forward and backward movement of the terminal 25'.

Figure 21:
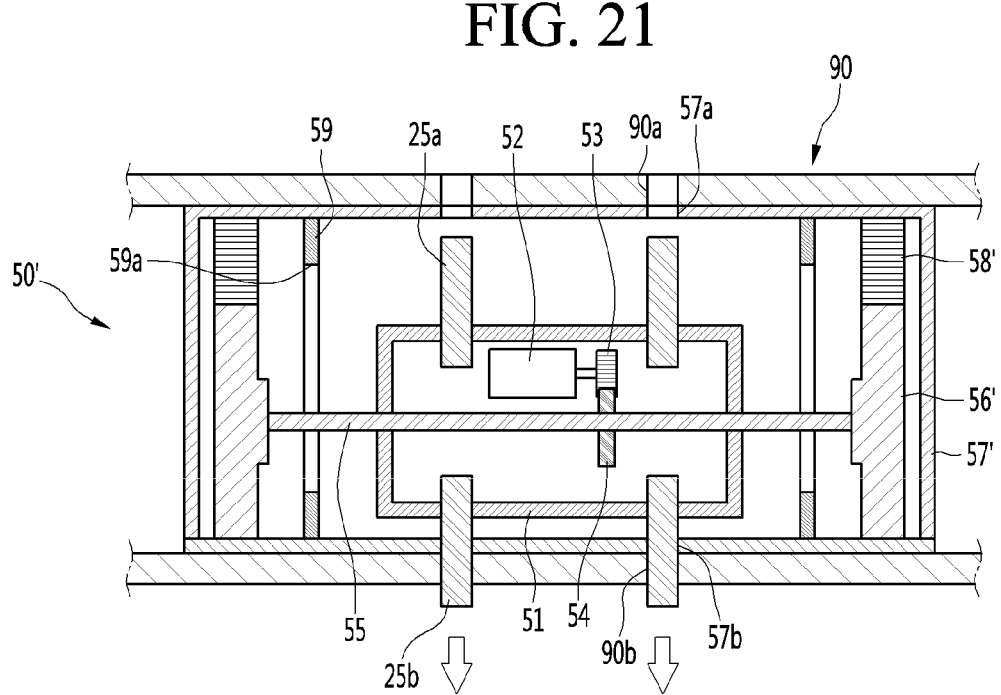
FIGS. 21 and 22 are cross-sectional views illustrating a configuration and operation of a moving mechanism according to another embodiment of the present disclosure.
Figure 22:
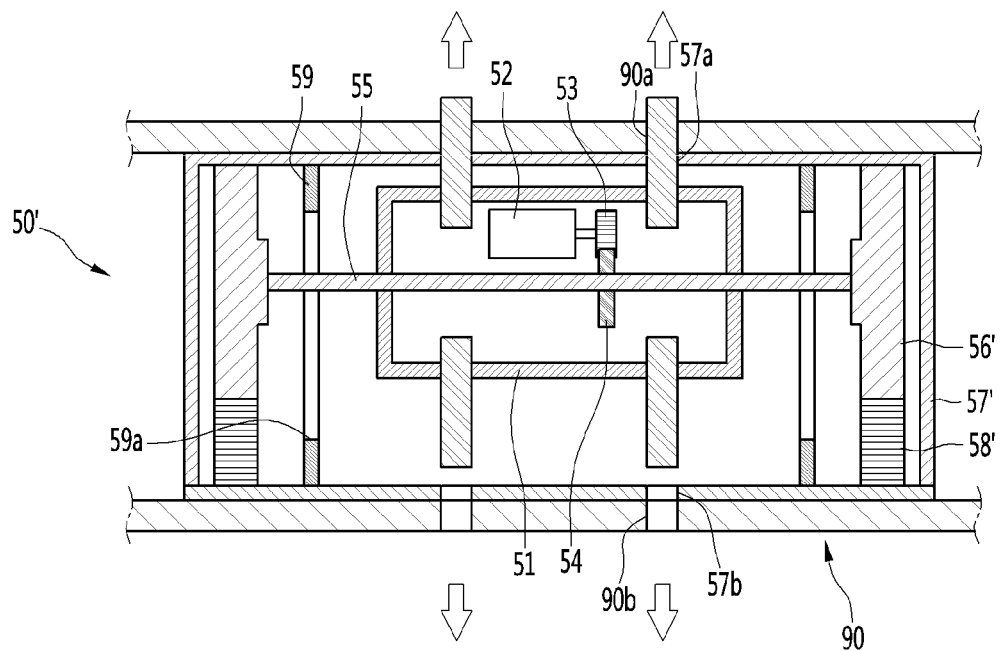

FIGS. 21 and 22 are cross-sectional views illustrating a configuration and operation of a moving mechanism according to another embodiment of the present disclosure.

Moving mechanism 50' according to the present embodiment may be embedded in the second case 90.

The moving mechanism 50' may include the housing 51, the motor 52, the shaft 55, a pinion 56', a supporter 57', a rack 58', and a restraining body 59.

The terminal 25 may include a first terminal 25a connected to one side of the housing 51 and facing the first hole 90a and a second terminal 25b connected to the other side of the housing 51 and facing the second hole 90b.

Both ends of the shaft 55 may be connected to the pinion 56', and the pinion 56' may rotate together with the shaft 55. That is, the shaft 55 may act as a driving shaft of the pinion 56'. The pinion 56' may be provided as a pair connected to both ends of the shaft 55, respectively.

Based on a state in which the second case 90 is erected, the supporter 57' may have a box shape with an open top surface. More specifically, the supporter 57 may include a horizontal lower panel, a pair of side panels vertically connected to both ends of the lower panel, a front panel connected to a front end of the lower panel and connecting the pair of side panels, and a rear panel connected to a rear end of the lower panel and connecting the pair of side panels.

The rack 58' may be engaged with the pinion 56'. Based on a state in which the second case 90 is erected, the rack 58' may be elongated in a front-rear direction and may be formed on the upper surface of the lower plate of the supporter 57'. The rack 58' may be provided as a pair spaced apart from each other in parallel.

Since the moving mechanism 50' includes the rack 58' and the pinion 56' instead of a wheel, the moving mechanism 50' may easily move the terminal 25a up and down in a state where the second case 90 is laid down.

When the second case 90 is located at the first position P1, the housing 51 and the terminal 25a, 25b connected to the housing 51 may move back and forth according to a rotation direction of the pinion 56'.

When the second case 90 is located at the second position P2, the housing 51 and the terminal 25a, 25b connected to the housing 51 may move up and down according to a rotation direction of the pinion 56'.

The supporter 57' may have a first opening 57a through which the first terminal 25a passes and a second opening 57b through which the second terminal 25b passes. The first opening 57a may penetrate through the front surface of the supporter 57 in a front-rear direction, and the second opening 57b may penetrate through the rear surface of the supporter 57 in a front-rear direction.

The first opening 57a may communicate with the first hole 90a, and the second opening 57b may communicate with the second hole 90b. The first opening 57a and the second opening 57b may be provided as pairs, respectively.

The restraining body 59 may be provided inside the supporter 57'. The restraining body 59 may be disposed between the housing 51 and the pinion 56'. The restraining body 59 may have a long hole 59a through which the shaft 55 passes.

Based on a state in which the second case 90 is erected, the long hole 59a may be elongated in a front-rear direction, and the shaft 55 may move back and forth along the long hole and may be restrained in a vertical direction.

Therefore, the restraining body 59 may prevent the pinion 56' from being separated from the rack 58' when the second case 90 rotates with respect to the first case 80.

Hereinafter, an operation of the moving mechanism 50' will be described.

In a state where the second case 90 is located at the first position P1, when the motor 52 rotates the shaft 55 and the pinion 56' in one direction, the housing 51 and the terminals 25a, 25b connected to the housing 51 may move forward.

The first terminal 25a may protrude to the front side of the second case 90 by sequentially passing through the first opening 57a of the supporter 57' and the first hole 90a of the second case 90.

The first terminal 25a may move forward up to a predetermined docking position.

In a state where the second case 90 is located at the first position P1, when the motor 52 rotates the shaft 55 and the pinion 56' in other direction, the housing 51 and the terminal 25a, 25b connected to the housing 51 may move backward.

The first terminal 25a may enter the inside of the second case 90 and may not protrude to the front side of the second case 90.

The first terminal 25a may move backward up to a predetermined hidden position. In this case, the second terminal 25b may also be located inside the second case 90.

Even when the end of the first terminal 25a is located in the first hole 90a, it may be defined that the first terminal 25a is located inside the second case 90. Even when the end of the second terminal 25b is located in the second hole 90b, it may be defined that the second terminal 25b is located inside the second case 90.

In a state where the second case 90 is located at the second position P2, when the motor 52 rotates the shaft 55 and the pinion 56' in the other direction, the housing 51 and the terminal 25a, 25b connected to housing 51 may be lifted.

The second terminal 25b may protrude to an upper side of the second case 90 by sequentially passing through the second opening 57b of the supporter 57 and the second hole 90b of the second case 90.

The second terminal 25b may be lifted up to a predetermined docking position.

In a state where the second case 90 is located at the second position P2, when the motor 52 rotates the shaft 55 and the pinion 56' in the one direction, the housing 51 and the terminal 25a, 25b connected to the housing 51 may be lowered.

The second terminal 25b may enter the inside of the second case 90 and may not protrude to the upper side of the second case 90.

The second terminal 25b may be lowered to a predetermined hidden position. In this case, the first terminal 25a may also be located inside the second case 90.

According to an embodiment of the present disclosure, since the plug protrudes to the rear of the case, the charging station may be installed as close to the wall as possible and the appearance of the charging station may be improved in design. In addition, there is no fear that people or moving robots get caught on an electric wire.

In addition, since the terminal is normally hidden in the case, a possibility that moisture or a person comes into contact with the terminal may be minimized.

In addition, the terminal may protrude from the case according to an approach distance of the moving robot. Accordingly, the moving robot may be easily docked to the terminal and charged.

In addition, the terminal may protrude from the case according to a remaining battery capacity of the moving robot. This may prevent the terminal from unnecessarily protruding when the moving robot simply passes by the charging station.

In addition, since the terminal may be lifted and lowered, various types of moving robots having connectors at different heights may be easily docked.

In addition, the rear cover lifted and lowered together with the plug may cover the rear hole inside the case and the front cover lifted and lowered together with the terminal may cover the front hole inside the case. As a result, it is possible to prevent moisture or foreign matter from entering the case through the front hole and the rear hole.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A charging station, comprising:
    a case, the case including:
        a front surface and a rear surface opposite to the front surface; and
        a rear hole on the rear surface of the case, the rear hole being vertically elongated;
    a plug protruding from the rear surface of the case and configured to vertically slide along the rear hole;
    a terminal provided at the case, the terminal being configured to:
        move between a hidden position at which the terminal is completely located in the case and a docking position at which the terminal protrudes from the front surface of the case, and
        allow a moving robot to be docked to the charging station; and
    a moving mechanism configured to move the terminal between the hidden position and the docking position.

2. The charging station of claim 1, further comprising a charging circuit provided inside of the case and electrically connected to the terminal and to the plug.

3. The charging station of claim 1, further comprising a plug lifting mechanism configured to slide the plug along the rear hole to allow the plug to be fitted to an electrical outlet.

4. The charging station of claim 1, further comprising a rear cover provided inside of the case and configured to slide together with the plug to cover the rear hole from the inside of the case.

5. The charging station of claim 1, further comprising:
    a receiver configured to wirelessly communicate with the moving robot and receive location information of the moving robot; and
    a controller configured to communicate with the receiver and control the moving mechanism to move the terminal to the docking position when the moving robot approaches within a predetermined distance from the charging station.

6. The charging station of claim 1, further comprising:
    a receiver configured to wirelessly communicate with the moving robot to receive location information and battery status information of the moving robot; and
    a controller configured to communicate with the receiver and control the moving mechanism to move the terminal to the docking position when the moving robot approaches within a predetermined distance from the charging station and a remaining battery capacity of the moving robot is less than a predetermined value.

7. The charging station of claim 1, wherein the moving mechanism comprises:
    a shaft;
    a motor configured rotate the shaft;
    a wheel connected to the shaft and configured to move with rotation of the shaft; and
    a supporter configured to support the wheel.

8. The charging station of claim 1, further comprising:
    a terminal lifting mechanism configured to lift and lower both the terminal and the moving mechanism; and
    a front hole vertically elongated on the front surface of the case, the terminal passing through the front hole.

9. The charging station of claim 8, further comprising:
    a receiver configured to wirelessly communicate with the moving robot and receive type information of the moving robot; and
    a controller configured to control the terminal lifting mechanism to lift and lower the terminal to a height corresponding to a connector of the moving robot.

10. The charging station of claim 8, further comprising a front cover provided inside of the case, the front cover being configured to be lifted and lowered together with the terminal to cover the front hole from the inside of the case.

11. The charging station of claim 10, further comprising a guide groove provided on an inner surface of the case, wherein the guide groove is configured to communicate with the front hole and to guide the lifting and lowering of the front cover.

12. A charging station, comprising:
    a first case, the first case comprising
        a front surface and a rear surface opposite to the front surface; and
        a rear hole on the rear surface of the first case, the rear hole being vertically elongated;
    a plug protruding from the rear surface of the first case and configured to vertically slide along the rear hole;
    a second case hingedly connected to the first case and configured to rotate between a first position at which the second case is vertically disposed and covers the front surface of the first case and a second position at which the second case is horizontally disposed after rotating downward from the first position;

a terminal provided at the second case, the terminal being configured to:
- move between a hidden position at which the terminal is completely located in the second case and a docking position at which the terminal protrudes from the second case, and
- allow a moving robot to be docked to the charging station; and a moving mechanism configured to move the terminal between the hidden position and the docking position.

13. The charging station of claim 12, further comprising a charging circuit provided inside of the first case or the second case and electrically connected to the terminal and to the plug.

14. The charging station of claim 12, wherein the moving mechanism includes a housing, and
wherein the terminal includes:
- a first terminal extending from a first side of the housing of the moving mechanism; and
- a second terminal extending from a second side of the housing of the moving mechanism, the second side of the housing being opposite to the first side of the housing.

15. The charging station of claim 14, wherein the moving mechanism is configured to:
- move the first terminal to protrude from a front surface of the second case when the second case is located in the first position, and
- move the second terminal to protrude from a rear surface of the second case when the second case is located at the second position, and
- wherein the front surface of the second case is opposite to the rear surface of the second case.

16. The charging station of claim 12, further comprising a plug lifting mechanism configured to vertically slide the plug along the rear hole to allow the plug to be fitted to an electrical outlet.

17. The charging station of claim 12, further comprising a rear cover provided inside of the first case and configured to slide together with the plug to cover the rear hole from the inside of the first case.

18. The charging station of claim 12, further comprising:
- a terminal lifting mechanism configured to lift and lower the terminal and the moving mechanism;
- a receiver configured to wirelessly communicate with the moving robot and receive type information of the moving robot; and
- a controller configured to control the terminal lifting mechanism to lift and lower the terminal to a height corresponding to a connector of the moving robot.

19. The charging station of claim 12, further comprising:
- a receiver configured to wirelessly communicate with the moving robot and receive location information of the moving robot; and
- a controller configured to communicate with the receiver and control the moving mechanism such that the terminal moves to the docking position when the moving robot approaches within a predetermined distance to the charging station.

20. The charging station of claim 12, further comprising:
- a receiver configured to wirelessly communicate with the moving robot to receive location information and battery status information of the moving robot; and
- a controller configured to communicate with the receiver and control the moving mechanism such that the terminal moves to the docking position when the moving robot approaches within a predetermined distance to the charging station and a remaining battery capacity of the moving robot is less than a predetermined value.

* * * * *